July 13, 1965 E. KUWERTZ 3,194,383
ARRANGEMENT FOR CONVEYING CLOTHING SUSPENDED FROM HANGERS
Filed March 21, 1963
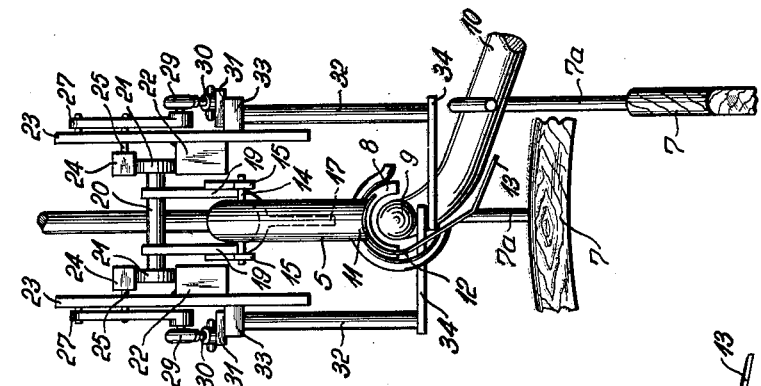
INVENTOR
Erich KUWERTZ
BY
AGT.

United States Patent Office 3,194,383
Patented July 13, 1965

3,194,383
ARRANGEMENT FOR CONVEYING CLOTHING SUSPENDED FROM HANGERS
Erich Kuwertz, Kaiserslautern, Pfalz, Germany, assignor to G. M. Pfaff AG, Kaiserslautern, Pfalz, Germany
Filed Mar. 21, 1963, Ser. No. 266,884
Claims priority, application Germany, Mar. 24, 1962, P 29,046
4 Claims. (Cl. 198—38)

The invention relates to conveyor systems for clothing and is particularly concerned with an arrangement for conveying articles of clothing that are suspended from hangers.

Conveyors are known for distributing clothing apparel hung upon hangers among a plurality of receiving stations where the hangers are picked up individually or in pairs by a carrier hook, are swept off at the delivery stations by means of a pawl that extends into the path of movement of the material carriers and are taken over by a receiving bar or the like which is disposed at a distance from the carrier hook. Conveyors of this type do not provide for safe transfer of the goods carried because during the sweeping or stripping from the carrier hook the hook portion of the material carriers can easily be turned or twisted so that it misses the receiving bar.

In accordance with the invention a conveyor is provided which has carrier elements that are adapted to receive a larger number of hangers or hooks and to deliver them safely at the discharge stations independently of the conveyor speed and without the need of an accurate discharge position. The carrier or conveyor element in accordance with the invention solves this problem in that it is provided with a carrier bar in the form of a track element that is open at one end and which extends partly around the receiving bars that are disposed parallel to the conveyor system. As a result the material carriers are transferred from the carrier bar directly onto the receiving bar which it partly encompasses, thus making it impossible to miss the receiving bars.

It is therefore an object of the invention to provide a conveyor for moving apparel on clothes hangers from one station to another by means of material carrier bars in the form of track elements which deliver the hangers directly to receiving bars at the receiving stations safely and rapidly.

Other objects and advantages of the invention will become apparent from the following description of an embodiment illustrated in the accompanying drawing, in which:

FIG. 1 is a perspective illustration of the carrier device at a discharge station shortly before transfer of the hangers, and FIG. 2 is an end view of the carrier device seen from the discharge end illustrating the discharge operation.

The conveyor chain 1 (FIG. 1) is provided at predetermined intervals with rollers 2 which run in a guide track 3 which, in turn, is mounted in a frame or on a ceiling. A material carrier 4 is linked to two such pairs of rollers and is movable along the conveyor track. The material carrier 4 has a tubular bail or stirrup 5 having an end 6 to which a carrier element or bar 8 is fastened in the longitudinal plane of the conveyor. This element 8 is in the form of a profiled track which is open at one end and defines a passageway with said bail 5 to receive the hangers 7 for the apparel to be conveyed, each of which has a suspension member 7a.

The carrier element 8 is arranged and profiled in a manner that it reaches from the top around a part 9 of the receiving bars 10 at the delivery or discharge stations, which part 9 is parallel to the direction of conveyor travel. Associated with the carrier element or bar 8 and secured to the free end 11 of the bail 5 is a stripping means comprising a stripping member 12 which has a bridge 13 that extends into the path of travel of the hangers 7. Furthermore, a lock lever 16 is linked to the bail 5 by means of a pin 14 and two connecting strips 15, one end 17 of which extends into a slot 18 provided in the carrier element or bar 8 and the other end of which is bifurcated, presenting legs 19. An axle 20 is journalled in the two legs 19, which during travel rests upon the bail 5 and which carries two rollers 21 at its ends.

Rollers 21 cooperate with the runner tracks 22 at the discharge stations (see FIG. 2) which are fastened to stationary support plates 23 and which have downwardly bent ends. Strips 24 are mounted parallel to the runner tracks 22 and are connected by means of pins 25 extending through arcuate slots 26 in the plates 23 with rocking levers 27, 28 disposed on the outside of the plates 23.

A link bar 30 is connected to each of the two forward rocking levers 27 by means of a ball joint 29. This bar is connected at its free end by means of a further ball joint 29 to a lever 31. Levers 31 are each connected to a switch bar 32, and the switch bars are journalled in a bearing eyelet 33 on the support plates 23. Each switch bar 32 has a stop lever 34 at the lower end thereof which is turned as the strips 24 are raised into the path of movement of the hangers 7.

The manner of operation of the conveyor is as follows:

The hangers 7 for the material to be conveyed are placed at a receiving or operating location onto the carrier element 8 and are moved to the discharge location. The direction of feed as seen in FIG. 1 is from right to left. During the feeding movement the axle 20 rests on the bail 5, so that the lock lever 16 extends into the slot 18 of the carrier element 8. The carrier element 8 is thus closed at both ends so that sliding off of the carrier hangers 7 is prevented as the carrier element 8 passes through inclines.

At the discharge locations the lock lever 16 is swung out of the slot 18 of the carrier element 8 as the rollers 21 run onto the runner tracks 22 so that the hangers 7 for the apparel being forwarded can be stripped off. Simultaneously the strips 24 are displaced or lifted parallel to one another by rollers 21. The rocking levers 27, 28 thus carry out a pivotal movement which is transferred by way of the link bars 30 and the switch bars 32 onto the stop levers 34 which are thus swung into the path of movement of the apparel hangers 7.

If the rollers 21 have completely run up onto the runner tracks 22 the foremost hanger 7 will be located immediately in front of the closed stop levers 34 as seen in the direction of movement. While the carrier device 4 moves further in the direction of feed, the hangers 7 are stripped off from the carrier element 8 and dropped directly upon the partially encompassed horizontal part 9 of the receiving bar 10. Inasmuch as the hangers 7 already encompass the horizontal part 9 of the receiving bar 10 prior to the stripping, it is impossible to miss this receiving bar.

During the further course of the conveying movement the rollers 21 pass the runner tracks 22 so that the axle 20 becomes again seated upon the bails 5. The locking lever 16 as well as also the stop lever 34 thus return to their initial position so that as seen in the direction of conveying the bridge 13 of the stripper 12 that engages the last hanger 7 continues to move the hangers 7 so far that they slide off on the downwardly directed part of the receiving bar 10 (FIG. 2).

In the embodiment of the invention illustrated in the drawings the hangers for the apparel are usually released at the discharge station which follows the loading station due to the rigid arrangement of the runner tracks 22. It is suitable for installations where the hangers carrying the material to be conveyed are to be introduced or discharged at the end locations of the conveyor or if it is necessary owing to intermediate loading to convey only to the next discharge station and the hangers are to be cast off automatically there.

If a plurality of discharge stations are provided in an installation where the hangers for the apparel are optionally cast off, then the runner tracks can be movably arranged. The conveyor members are then provided with a selecting device which cooperates in a known manner with destination indicators that may be provided at the discharge stations. If the indicator to which the selecting device is adjusted is in agreement with the destination indicator of the discharge location, the runner track is moved into the path of movement of the rollers, for example, by means of an electromagnet so that they initiate the transfer movement of the hangers for the apparel as indicated above.

Having now described my invention with reference to the embodiment illustrated in the drawings, I do not wish to be limited thereto, but what I desire to protect by United States Letters Patent is set forth in the appended claims.

I claim:

1. System for conveying clothing apparel or the like disposed on hangers discharged automatically at preselectable receiving stations, said system comprising a stationary receiving bar at a receiving station, conveyor means, a material carrier having a bail and a carrier element adapted to encompass said receiving bar along one side thereof and having one end connected to said bail and one free end spaced from said bail to define a passageway, conveyor connecting means linking said carrier element with said conveyor to be moved thereby, means including a locking member and stripping means adapted to move hangers on said receiving bar, operative to open and close said passage, stationary means operative to actuate said locking member and stripping means adapted to move hangers on said receiving bar.

2. System for conveying clothing apparel or the like disposed on hangers discharged automatically at preselectable receiving stations, said system comprising a stationary receiving bar at a receiving station, conveyor means, a material carrier having a bail and a carrier element adapted to encompass said receiving bar along one side thereof and having one end connected to said bail and one free end spaced from said bail to define a passageway, conveyor connecting means linking said carrier element with said conveyor to be moved thereby, means including a locking member linked to and carried by said bail and having one end disposed proximate said free end of said carrier element and being operative to open and close said passageway, stationary means operative to actuate said locking member, and stripping means adapted to move hangers on said receiving bar, said conveyor connecting means including a bail member disposed parallel to said carrier element and connected at one end to said connected end of said carrier element and connected intermediate its ends to said conveyor.

3. System for conveying clothing apparel or the like disposed on hangers discharged automatically at preselectable receiving stations, said system comprising a stationary receiving bar at a receiving station, conveyor means, a material carrier having a carrier element adapted to encompass said receiving bar along one side thereof and having a connected end and a free end, conveyor connecting means linking said carrier element with said conveyor to be moved thereby, means including a locking member operative to open and close said free end of said carrier element, stationary means operative to actuate said locking member, said conveyor connecting means including a bail member disposed parallel to said carrier element and connected at one end to said connected end of said carrier element and connected intermediate its ends to said conveyor, and a downwardly extending stripping member supported on the other end of said bail member and having a bridge portion extending below and transversely of said receiving bar.

4. System for conveying clothing apparel or the like disposed on hangers discharged automatically at preselectable receiving stations, said system comprising a stationary receiving bar at a receiving station, conveyor means, a material carrier having a carrier element adapted to encompass said receiving bar along one side thereof and having a connected end and a free end, conveyor connecting means linking said carrier element with said conveyor to be moved thereby, means including a locking member operative to open and close said free end of said carrier element, stationary means operative to actuate said locking member, said conveyor connecting means including a bail member disposed parallel to said carrier element and connected at one end to said connected end of said carrier element and connected intermediate its ends to said conveyor, said carrier element presenting a slot at said free end and said locking member being a lever linked to said bail member having a lock end movable into and out of engagement with said slot and having a bifurcated end, means pivotally connecting said bifurcated end to said bail member, an axle normally riding on said bail member, a pair of rollers supported at opposite ends of said axle, stationary runner tracks mounted parallel to said receiving bar adapted to guide said rollers and thereby lift said locking member out of engagement with said slot, and at least one pivotally movable stopping lever disposed for the operative condition of said device proximate said connected end of said carrier element and below said receiving bar in the path of movement of hangers on said carrier element, and pivotally movable linkage means having a movable member in the path of movement of said axle and a member operatively linked to said stopping lever.

References Cited by the Examiner

UNITED STATES PATENTS

| 1,775,545 | 9/30 | Anderson | 198—38 |
| 2,609,083 | 9/52 | Leach. | |
| 2,854,126 | 9/58 | Rosenberger | 198—177 X |

FOREIGN PATENTS 791,276  2/58  Great Britain.

SAMUEL F. COLEMAN, Primary Examiner.

WILLIAM B. LA BORDE, Examiner.